Patented Aug. 7, 1945

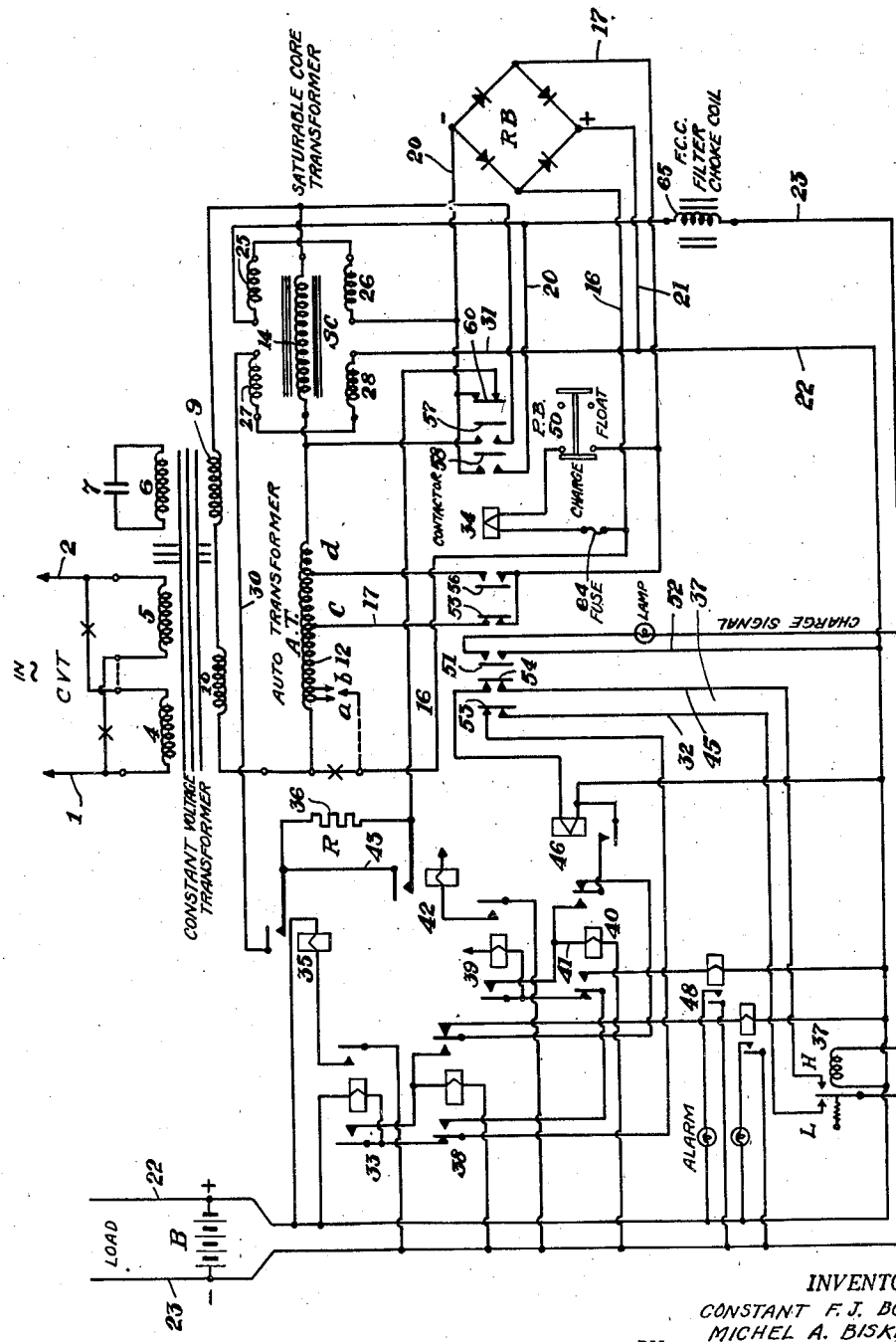

2,381,715

UNITED STATES PATENT OFFICE 2,381,715

VOLTAGE REGULATING SYSTEM

Constant F. J. Boehlen, East Orange, N. J., and Michel A. Biske, New York, N. Y., assignors to Federal Telephone & Radio Corporation, New York, N. Y., a corporation of Delaware Application August 31, 1943, Serial No. 500,606

10 Claims. (Cl. 175—363)

This invention relates to automatic or self regulating rectified current supply systems particularly adapted for transmitting a closely regulated rectified current supply to a consuming circuit proportionate to the demands thereof and having automatic compensation for variations in voltage drop in the rectifier circuit at increased load and operable as a function thereof. It further includes compensating means for correction of the non-correspondence of magnetization and voltage curves associated with the compensating circuit alteration and has further provision for selectively altering the circuit conditions for battery floating or charging operation and likewise as related to the unaged or aged condition of the rectifier elements.

The system of the present invention is designed for special advantage and utility under substantial variations of load and intermittent or periodic load conditions such as those imposed in the instance of isolated automatic telephone exchanges requiring direct current energy in intermittent duty operation, in aircraft and vehicle systems and the like, wherein substantial variations of both the A. C. current supply and of the load conditions and requirements are to be met. While particularly designed for use in association with a battery circuit, wherein the latter functions to assist in the peak load demand, it is further operable, by reason of its improved and close regulation, as referred to, for consuming circuit energizing with direct load connection to the rectifier and elimination of the battery.

Associated with the improved regulating system of the character described there is incorporated a chain or progressively acting relay and blocking relay circuit arrangement operative upon successive voltage drop in the load circuit, first to close the compensating coil circuit through a resistance, secondly to short circuit the resistance to further build up the voltage and finally upon further voltage drop to close an alarm circuit to indicate the inadequacy of the regulation. With this is combined high voltage responsive relay circuit means operative successively to reinstate the resistance in the compensating coil circuit; upon a succeeding high voltage to open the circuit of the compensating coils and then upon a succeeding high volatge to energize a high voltage alarm circuit. The invention further includes an improved battery charging control operative for altering the circuit arrangement to better adapt it for charging operation.

The described and other features of the present improvements will be more fully understood by reference to the accompanying drawing wherein a preferred embodiment of the invention is shown.

In the approved embodiment of the invention as herein diagrammatically illustrated the input or energizing of the regulated rectifier circuit is by means of the constant voltage transformer CVT connected to the alternating current supply source leads 1 and 2. The transformer as shown has the two primary windings 4 and 5 which are connected in parallel as shown in full lines for a 220 volt input or may be connected in series as shown in dotted lines for a 380 volt input circuit. The transformer as indicated has three other windings including the upper right hand winding 6 having a closed circuit and a capacitor 7 in series therewith and in operation functions to stabilize the output voltage as a result of its induced current. It further includes the second lower right hand winding 9 which is the actual secondary winding and also the lower left hand winding 10 which is a compensating winding. The object of this transformer is to maintain the output voltage of the regulated rectifier energizing circuit within exceedingly narrow limits which may be plus or minus 1% or less for line voltage variations of plus or minus 15% and load variations ranging from zero to 100%.

The secondary winding 9 of this transformer is connected to an auto-transformer AT having its winding 12 connected in series with the A. C. winding 14 of a saturable core transformer or saturable choke coil indicated generally as SC. The energizing circuit for the rectifier, including the secondary 9, is as shown connected by leads 16 and 17 to the opposite A. C. input terminals of the rectifier bridge network RB for the energizing thereof under the influence of the auto transformer and saturable choke regulation as further described.

The rectifier bridge network is desirably of the selenium plate type, having its conjugate output terminals connected by leads 20 and 21 to the consuming circuit leads 22 and 23. In association with the use of the selenium rectifier as indicated an adjustable tap connection is provided to the auto transformer winding by means of taps *a* and *b*, the taps being adjustably used in accordance with the aging of the rectifier stacks and eliminated when fully aged as indicated by full line. In accordance with the invention the auto transformer winding 12 is provided with additional taps *c* and *d* connecting through relay controlled contacts in the lead 17 to the rectifier of which the tap *c* will be used for floating operating and tap *d* for charging in association with battery use in the consuming circuit.

For the purpose of regulating the voltage supply to the rectifier responsive to the load conditions the saturable choke coil SC is provided with regulating coils 25, 26 and 27, 28 suitably connected to the D. C. or output terminals of the rectifier bridge RB to be energized responsive to the load conditions of the latter. During normal floating operation the rectifier current flows through the series windings 25 and 26 of the saturable choke coil SC and reduces the reactance of the A. C. winding 14 resulting in increased output of the rectifier. It therefore increases the E. M. F. in the auto-transformer to compensate for increased voltage drop in the consuming circuit under increased load. The series windings 25 and 26 thus act as a voltage regulator in function of the output current.

Since the magnetization curve and the voltage drop curve of the regulating means thus provided do not correspond in value it is further desirable to provide for an additional voltage regulation responsive to and operating in function with the load. In accordance with the present improvements this is provided for by means of the shunt windings 27 and 28 which as shown are connected across the output voltage by connections 30 and 31 which are operable under the control of a relay circuit when required. Accordingly during floating operation, when the regulation through the series winding 14 of the saturable coil runs short it is provided that a low voltage signal or control impulse will be received on a lead 32 to operate relay 33 through a contact of the contactor 34. This is effected by the operation of a voltage relay 37 connected across the load circuit as indicated and having high and low voltage contacts H and L as shown connected to leads 45 and 32 respectively. As a result of closing of low voltage contact L a power relay 35 will operate and its front contact will close the circuit through the coils 27 and 28 through a resistor 36. In consequence the direct current magnetic field in the saturable choke will be increased and the reactance reduced which will in turn raise the output voltage.

Responsive to the increase in the voltage output and the opening of the circuit or ground at L from the lead 32 the relay 38 will operate in series with relay 33 over the latter's locking contact as indicated. When the ground is connected to lead 32, indicating again a low voltage, relay 39 will operate over a front contact of relay 38 and a back contact of a relay 40. A power relay 42 will then short circuit the resistor 36 by shunting connection 43 and accordingly increase the current through the shunt windings 27 and 28 of the saturable choke coil thus to further increase the output E. M. F. When the ground is again disconnected from the lead 32 the relay 40 will operate in series with relay 39 over the latter's locking contact. If another ground connection is applied to lead 32, indicating again a low output voltage it will produce an impulse over the left front contact of the relay 40 to energize an alarm circuit 48 giving indication of inadequacy of regulation for load.

It is arranged however that if the load decreases and the voltage reaches the upper limit a ground will be connected to a lead 45 by closing of contact H which will operate, over another back contact 54 of the contactor 34, the polarity reversing relay 46. This relay will apply a potential through its front contact and the right front contact of relay 40 for holding relay 40 and short circuiting relay 39 through connection 41. This effects the release of relay 39 as well as relay 42 as a result the resistor 36 is reinstated in the circuit of the shunt winding 27 and 28 of the saturable choke. As soon as the ground is disconnected from lead 45 it releases 46 and 40. A high voltage is indicated by a ground connected to lead 45 again operating relay 46 and this time the battery or potential short circuits relay 33 which releases relay 35 and in consequence opens the circuit of the shunt winding 27 and 28 and reducing the E. M. F. of the output. When the ground is disconnected from lead 45 the relays 46 and 38 release and the relay circuit is again in the normal condition where all voltage regulation is left to the saturable choke coil circuit through windings 25, 26.

A then further closing of contact H, responsive to voltage rise, will close an alarm circuit over the right hand back contact of relay 38.

For charging of the battery B in float connection with the output leads, a higher E. M. F. is required. Provision is made to alter the circuit to meet these conditions consisting of a push button switch 50 in series with the coil of multiple switch contactor 34 to effect energizing thereof, the latter being provided with movable contact 51 closing a circuit 52 to ground to give a charge indication by lamp signal and likewise movable contact 53 arranged to open lead 32 and similar contact 54 arranged to open lead 45 of the voltage controlled circuit. Simultaneously a movable contact 55 will open the circuit from tap c while connecting the rectifier bridge to tap d by means of the contact 56; and by means of a further movable contact 57 the A. C. winding 14, and by means of contact 58 the series windings 25 and 26 of the saturable choke, are short circuited. At the same time by means of contact 60 of contactor 34 the circuit to the shunt windings 27 and 28 of the saturable choke SC will open. This accordingly removes the automatic regulation control in a manner to permit of the increased E. M. F. for battery charging operation. At 64 is indicated a fuse and at 65 there is shown a filter choke coil in the load circuit for the protection thereof in the usual manner.

What is claimed is:

1. A rectified current supply system including an A. C. energizing source, a transformer having a primary winding energized thereby, said transformer having a secondary winding arranged in series with a regulating circuit, a rectifier having input connections to the regulated circuit, said regulated circuit having in series relation an auto-transformer and a saturable core transformer having coupled thereto series inductance means connected to the load circuit from the rectifier for controlling the regulated circuit responsive to load, supplemental regulating inductance means, means connecting said supplemental inductance means across said load circuit, and an energizing circuit therefor including a resistor and a connection in shunting relation thereto and relay means operatively connected to close the supplemental inductance circuit responsive to load.

2. A rectified current supply system for feeding a battery to be charged, comprising an A. C. energizing source, a transformer having a primary winding, and a secondary winding in series with a regulating circuit, a rectifier having input connection to the regulating circuit, said regulating circuit having in series relation an auto-transformer and a saturable choke coil having coupled thereto regulating coils in series with the load circuit and a battery charging circuit connection from the auto-transformer to the rectifier and means for closing the battery charging circuit and simultaneously therewith opening the circuit from the load to the regulating coils.

3. A rectified current supply system comprising an A. C. energizing source, a transformer having a primary winding energized thereby and a secondary winding coupled with the primary winding and in series with a regulating circuit, a rectifier bridge network having input connections to the regulating circuit and conjugate terminal connections to a load circuit, said regulating circuit including in series relation an auto-transformer and a saturable core transformer, the latter having coupled thereto regulating coils in series with the load circuit and further regulating coils in shunt relation to the load, the circuit connections to said latter regulating coils including a resistor and a shunting connection relative thereto including a relay switch, a voltage relay having circuit connection to the load circuit and operable to control the circuit of the relay switch.

4. A rectified current supply system for feeding a battery to be charged, comprising an A. C. energizing source, a transformer having a primary winding energized thereby, a secondary winding in series with a regulating circuit, a rectifier having input connection to the regulating circuit, said regulating circuit having in series relation an auto-transformer and a saturable choke coil, said choke coil having coupled thereto regulating coils in series with the load circuit and further regulating coils in shunt relation to the load to compensate for non-correspondence of the magnetization and voltage curves and a battery charging circuit connection from the auto-transformer to the rectifier and means for closing the battery charging circuit and simultaneously therewith opening the circuits to the regulating coils, and short circuiting the saturable choke coil.

5. A rectified current supply system for feeding a battery to be charged, comprising an A. C. energizing source, a transformer having a primary winding energized thereby, a secondary winding in series with a regulating circuit, a rectifier having input connection to the regulating circuit, said regulating circuit having in series relation an auto-transformer and a saturable choke core transformer, said saturable core transformer having coupled thereto regulating coils in series with the load circuit and a battery charging circuit connection from the auto-transformer to the rectifier, means for closing the battery charging circuit and simultaneously therewith opening the circuit from the load to the regulating coils and for closing a battery charging signal circuit.

6. A rectified current supply system comprising a transformer having a primary winding in series with an A. C. source, a secondary winding in series with a regulating circuit, a rectifier having input connection to the regulating circuit, said regulating circuit having in series relation an auto-transformer and a saturable core transformer and said saturable core transformer having coupled thereto a regulating coil connected in series with the load circuit from the rectifier and a further regulating coil in shunt relation to the load to compensate for non-correspondence of the magnetization and voltage curves relay means operatively connected to close the latter regulating coil circuit, a voltage relay connected to operate the relay means responsive to load, relay circuit means in blocking relation to said first relay means, an alarm circuit and alarm relay means connected to close the alarm circuit responsive to voltage drop of the blocking relay circuit.

7. A rectified current supply system comprising a transformer having a primary winding in series with an A. C. source, a secondary winding in series with a regulating circuit, a rectifier comprising selenium rectifier plates having input connection to the regulating circuit, said regulating circuit having in series relation an auto-transformer and a saturable core transformer, the latter having coupled thereto a regulating coil connected in series with the load circuit from the rectifier, a further regulating coil in shunt circuit relation, relay means operatively connected to close the regulating shunt circuit, a relay connected to operate the relay means responsive to load, relay circuit means in blocking relation to said first relay means, an alarm circuit and alarm relay means connected to close the alarm circuit responsive to voltage drop in the blocking relay circuit.

8. A rectified current supply system comprising a transformer having a primary winding in series with an A. C. source, a secondary winding in series with a regulating circuit, a rectifier having input connection to the regulating circuit, said regulating circuit including in series therewith a saturable core transformer having coupled thereto a regulating coil in series with the load circuit from the rectifier and a further regulating coil in shunt relation to the load, a circuit connection to the latter coil having a switch and a resistor in parallel, an alarm circuit, and relay and blocking relays circuit means operatively related successively to close the circuit of the shunt regulating coil through the resistor, to open the resistor circuit for increased regulation and thereafter upon further drop in voltage to close the alarm circuit.

9. A rectified current supply system comprising an A. C. energizing source, a constant voltage transformer having a primary winding energized thereby, and a secondary winding in series with a regulating circuit, a rectifier having input connections to the regulating circuit, said regulating circuit including in series therewith a saturable core transformer having coupled thereto a series inductance connected to the load circuit from the rectifier for controlling of the regulating circuit responsive to load and a further regulating inductance connected in shunt to the load and relay means connected to be responsive to the load circuit voltage for controlling the circuit of the latter inductance.

10. A rectified current supply system comprising a transformer having a primary winding in series with an A. C. source, a secondary winding in series with a regulating circuit, a rectifier having input connection to the regulating circuit, said regulating circuit including in series therewith a saturable core transformer having coupled thereto a regulating coil in series with the load circuit from the rectifier and a further regulating coil in shunt relation to the load, a circuit connection to the latter coil having a switch and a resistor in parallel and relay and blocking relay circuit means operatively related successively to close the circuit of the shunt regulating coil through the resistor and to open the resistor circuit for increased regulation responsive to successive voltage drop in the load circuit and to close the resistor circuit and to open the shunt regulating coil circuit upon successively increased load voltages.

CONSTANT F. J. BOEHLEN.
MICHEL A. BISKE.